(12) United States Patent
Inokuchi

(10) Patent No.: US 7,318,026 B2
(45) Date of Patent: Jan. 8, 2008

(54) ENCODING APPARATUS AND METHOD, DECODING APPARATUS AND METHOD, AND RECORDING MEDIUM RECORDING APPARATUS AND METHOD

(75) Inventor: Tatsuya Inokuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 847 days.

(21) Appl. No.: 10/432,254

(22) PCT Filed: Sep. 30, 2002

(86) PCT No.: PCT/JP02/10146

§ 371 (c)(1),
(2), (4) Date: May 22, 2003

(87) PCT Pub. No.: WO03/032296

PCT Pub. Date: Apr. 17, 2003

(65) Prior Publication Data

US 2004/0028126 A1    Feb. 12, 2004

(30) Foreign Application Priority Data

Oct. 3, 2001 (JP) ............................. 2001-307548

(51) Int. Cl.
*G10L 19/02* (2006.01)
(52) U.S. Cl. .................................................. 704/229
(58) Field of Classification Search ................. 704/229
See application file for complete search history.

(56) References Cited

U.S. PATENT DOCUMENTS

| | | | | |
|---|---|---|---|---|
| 3,881,064 A | * | 4/1975 | Schlichte | 370/364 |
| 4,713,776 A | * | 12/1987 | Araseki | 704/229 |
| 4,744,085 A | * | 5/1988 | Fukatsu | 714/746 |
| 4,981,066 A | * | 1/1991 | Kakizaki | 84/613 |
| 5,438,643 A | | 8/1995 | Akagiri et al. | |
| 5,481,511 A | * | 1/1996 | Yanagida | 369/30.09 |
| 5,592,584 A | * | 1/1997 | Ferreira et al. | 704/203 |
| 5,642,463 A | * | 6/1997 | Nakano et al. | 704/201 |
| 5,835,030 A | * | 11/1998 | Tsutsui et al. | 341/51 |
| 5,966,179 A | * | 10/1999 | Kondo et al. | 375/240.18 |
| 5,990,963 A | * | 11/1999 | Mishima et al. | 375/240.24 |
| 6,038,369 A | * | 3/2000 | Imai | 386/95 |
| 6,041,302 A | * | 3/2000 | Bruekers | 704/503 |
| 6,054,943 A | * | 4/2000 | Lawrence | 341/87 |

FOREIGN PATENT DOCUMENTS

| | | |
|---|---|---|
| EP | 0 559 348 A2 | 9/1993 |
| EP | 0 696 114 A1 | 2/1996 |
| EP | 0 994 569 A2 | 4/2000 |

(Continued)

*Primary Examiner*—Tālivaldis Ivars Šmits
*Assistant Examiner*—Justin W. Rider
(74) *Attorney, Agent, or Firm*—Oblon, Spivak, McClelland, Maier & Neustadt, P.C.

(57) ABSTRACT

An encoding method comprising the steps of forming a difference signal which is the difference between a first channel signal and a second channel signal of an input PCM signal, encoding the difference signal and the second channel signal with a time difference, dividing a signal which has been encoded with the time difference in the unit of a predetermined number of bits, adaptively encoding the divided data in the unit of the predetermined number of bits, and arranging the adaptively encoded data in a predetermined format.

55 Claims, 8 Drawing Sheets

FOREIGN PATENT DOCUMENTS

| | | |
|---|---|---|
| JP | 3-108824 | 5/1991 |
| JP | 5-205405 | 8/1993 |
| JP | 9-120647 | 5/1997 |
| JP | 2000-214889 | 8/2000 |
| JP | 2001-111542 | 4/2001 |
| JP | 2001-167563 | 6/2001 |
| JP | 2001-195092 | 7/2001 |
| WO | WO 95/19662 | 7/1995 |
| WO | 98/46045 | 10/1998 |

* cited by examiner

Fig. 6

| BLOCK HEADER(DATA LENGTH OF EACH GROUP, WHETHER OR NOT EACH GROUP HAS BEEN ENCODED, ETC) |
| --- |
| FIRST SAMPLE DATA OF BLOCK (16 BITS X 2 = 4 BYTES) |
| DATA OF GROUP GP1 (ENCODED DATA) |
| DATA OF GROUP GP2 (ENCODED DATA) |
| DATA OF GROUP GP3 (NON-ENCODED DATA) |
| DATA OF GROUP GP4 (ENCODED DATA) |
| DATA OF GROUP GP5 (ENCODED DATA) |
| DATA OF GROUP GP6 (NON-ENCODED DATA) |

Fig. 7A

←——————————— 7bit ———————————→

| | | | |
| --- | --- | --- | --- |
| Data1 | 1 | POSITION OF LONGEST MATCH IN SLIDE DICTIONARY (HIGH ORDER 6 BITS) (0 WHEN NOT MATCHED) | |
| Data2 | 0 | LENGTH OF MATCH (4 BITS) | POSITION IN DICTIONARY (LOW ORDER 2 BITS) |

IN THE CASE OF MATCH

Fig. 7B

| | | |
| --- | --- | --- |
| Data3 | 0 | NON-MATCH DATA |

IN THE CASE OF NO MATCH

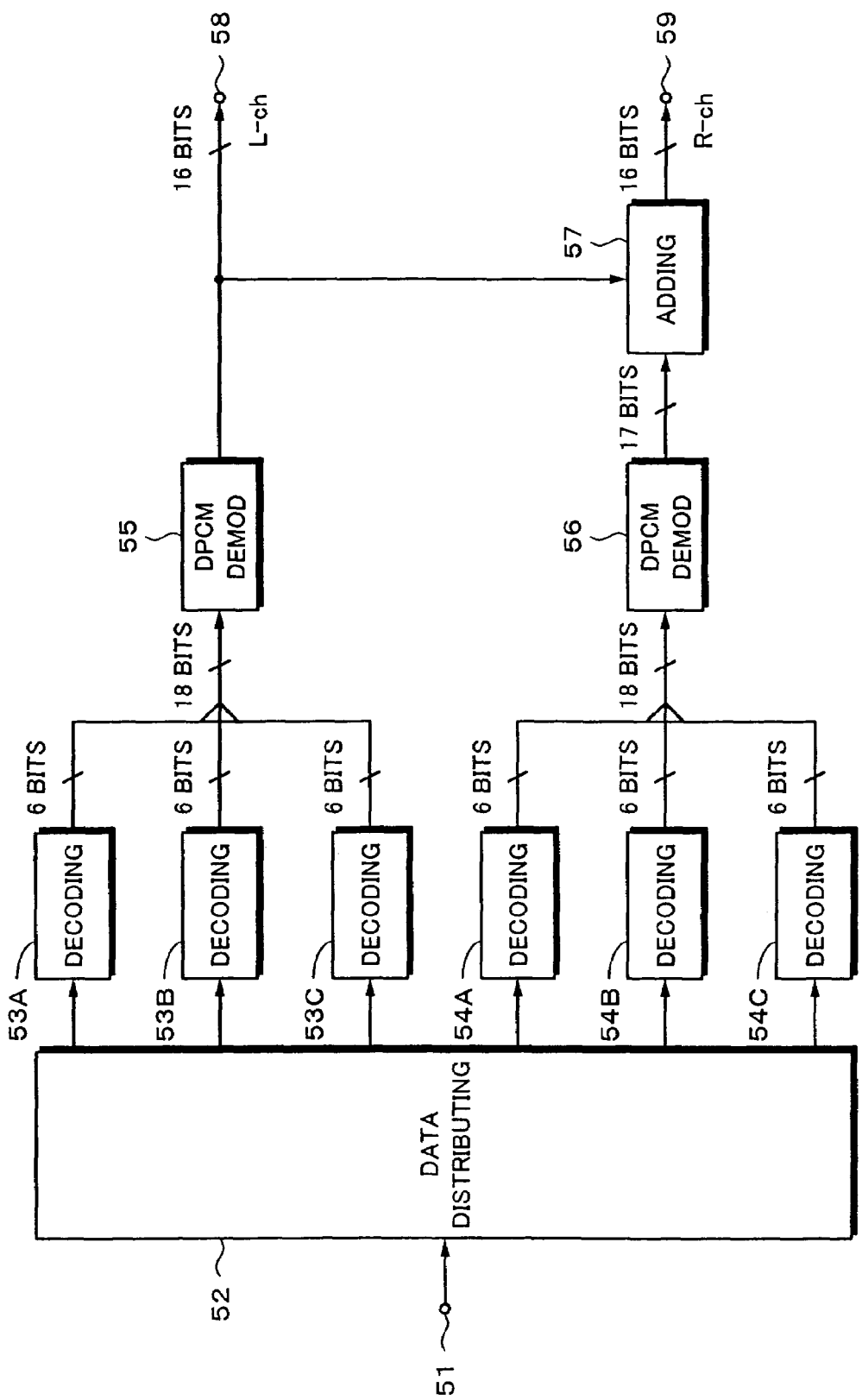

ENCODING APPARATUS AND METHOD, DECODING APPARATUS AND METHOD, AND RECORDING MEDIUM RECORDING APPARATUS AND METHOD

TECHNICAL FIELD

The present invention relates to an encoding apparatus and method, a decoding apparatus and method, and a recording medium recording apparatus and method suitable for compressing a PCM (Pulse Code Modulation) audio signal such as music data with a reversible code.

BACKGROUND ART

In recent years, computer networks have been popularized and large capacity recording and reproducing mediums come out. As a result, music data has been quite often dealt on computers. When music data is handled on computers, irreversible codes such as MP3 (MPEG1 Audio Layer-3), AAC (MPEG2 Advanced Audio Coding), ATRAC (Adaptive TRansform Acoustic Coding: trademark) 3, and so forth have been often used. This is because irreversible codes can attain an highly efficient compression.

In other words, compression encodes are categorized as irreversible codes and reversible codes. The irreversible codes are effective when data is highly efficiently compressed. However, the irreversible codes result in a data loss. Thus, when for example music data is compressed with an irreversible code, since a data loss takes place, the audio quality deteriorates.

In contrast, reversible codes allow data which has been compressed to be completely restored without a data loss. Thus, when for example music data is compressed with a reversible code, the audio quality does not deteriorate. However, it is difficult to attain a higher compression rate with a reversible code than with an irreversible code.

Conventionally, to efficiently transfer music data at a limited transmission rate and efficiently record the music data on a recording and reproducing medium having a limited capacity, an irreversible code has been mainly used.

However, nowadays broadband lines have been used and large quantity data transferred therethrough. In addition, large capacity and inexpensive recording and reproducing mediums have come out. Thus, it is thought that audio quality will be valued above the compression rate. In other words, it is thought that a reversible code, which is free of deterioration of audio quality, will become more important than an irreversible code, which involves deterioration of audio quality.

Conventionally, to maintain affinity of music data recorded on a CD-DA (Compact Disc Digital Audio) disc with a computer, it is thought that music data is recorded in CD-ROM (Compact Disc Read Only Memory) format. At that point, it is thought that music data is encoded so as to protect copyright thereof.

However, since the record capacity of user data for one frame in the CD-ROM format is smaller than the record capacity of music data for one frame of a CD-DA disc, if music data of the CD-DA disc is recorded in the CD-ROM format, it will become difficult to attain the same reproduction duration as the CD-DA disc.

In other words, in the CD, data is managed in the unit of a block composed of 98 frames. In the CD-DA disc, data of 24 bytes is allocated to each frame. The data capacity of one block composed of 98 frames amounts to (98×24=2352 bytes).

In contrast, in the CD-ROM format, a sync, a header, and an error correction code are added to data of each block. In other words, when an error occurs in data on the CD-ROM, since the error cannot be dealt with an interpolating process or the like, a stronger error correcting process is required. To do that, error correction auxiliary data is added. Thus, the capacity of user data for one block becomes 2048 bytes.

In the CD-DA disc, music data of 2352 bytes is recorded per block. In contrast, in the CD-ROM, the capacity of user data of one block is 2048 bytes. When music data recorded on one DC-DA disc is recorded in the CD-ROM format, the data amount becomes insufficient. Thus, music data recorded on one CD-DA disc cannot be fully recorded on one disc in the CD-ROM format.

Thus, it is thought that music data of 2352 bytes as one block is compressed to around 2048 bytes and recorded in the CD-ROM format. Since music data is compressed from 2352 bytes to 2048 bytes, it can be sufficiently compressed with a reversible code. At that point, when music data is compressed with a reversible code, the audio quality of music data hardly deteriorates.

From the forgoing point of view, it is desired that a PCM audio signal such as music data should be effectively compressed with a reversible code. As reversible codes, Huffman code, arithmetic code, moving Huffman code, universal codes (LZ Lempel Ziv) 77, LZ SS, LZ 78, and LZ W), and so forth are known. The reversible code encoding basically uses the biasing of data, removes a meaningless code, and compresses a meaningful code. In contrast, since a music PCM signal is composed of random numbers, it cannot be properly compressed with a reversible code. When the signal is encoded with a reversible code, the data amount of the resultant data may become larger than that of the original data.

When a PCM audio signal is encoded on real time basis and recorded and reproduced to and from the medium, it is desired that both an encoding process and a decoding process should be performed at high speed. However, in the conventional reversibly compressing system, in particular, the encoding process takes a long time.

Therefore, an object of the present invention is to provide an encoding apparatus and method, a decoding apparatus and method, and a recording medium recording apparatus and method which allow a PCM audio signal to be effectively reversibly encoded and both an encoding process and a decoding process to be performed at high speed.

DISCLOSURE OF THE INVENTION

The present invention is an encoding apparatus, comprising a difference signal generating portion for forming a difference signal which is the difference between a first channel signal and a second channel signal of an input PCM signal, a time difference encoding process portion for encoding the difference signal and the second channel signal with a time difference, a dividing process portion for dividing an output signal of the time difference encoding process portion in the unit of a predetermined number of bits, an adaptively encoding process portion for adaptively encoding output data of the dividing process portion in the unit of the predetermined number of bits, and an output portion for arranging output data of the adaptively encoding process portion in a predetermined format.

The present invention is an encoding method, comprising the steps of forming a difference signal which is the difference between a first channel signal and a second channel signal of an input PCM signal, encoding the difference signal and the second channel signal with a time difference, dividing a signal which has been encoded with the time difference in the unit of a predetermined number of bits, adaptively encoding the divided data in the unit of the predetermined number of bits, and arranging the adaptively encoded data in a predetermined format.

The present invention is a decoding apparatus, comprising a distributing process portion for distributing data which has been arranged in a predetermined format in the unit of a predetermined number of bits, an adaptively decoding process portion for performing a decoding process for the data distributed in the unit of the predetermined number of bits by the distributing process portion, a time difference decoding process portion for decoding output data of the adaptively decoding process portion to a second channel signal and a difference signal of a first channel signal and the second channel signal, and an adding process portion for adding the second channel signal and the difference signal and generating the first channel signal as an output signal.

The present invention is a decoding method, comprising the steps of distributing data which has been arranged in a predetermined format in the unit of a predetermined number of bits, performing an adaptively decoding process for the data distributed in the unit of the predetermined number of bits, performing a time difference decoding process for data for which the adaptively decoding process has been performed so as to generate a second channel signal and a difference signal of a first channel signal and the second channel signal, and adding the second channel signal and the difference signal and generating the first channel signal as an output signal.

The present invention is a record medium recording method, comprising the steps of forming a difference signal which is the difference between a first channel signal and a second channel signal of an input PCM signal, encoding the difference signal and the second channel signal with a time difference, dividing the signal which has been encoded with the time difference in the unit of a predetermined number of bits, adaptively encoding the divided data in the unit of the predetermined number of bits, arranging the data which has been adaptively encoded to predetermined data so as to encode the data, converting the encoded data into a predetermined data format, performing an error correction code encoding process for the encoded data, and performing a modulating process for the data for which the error correction code encoding process has been performed and recording the modulated data on a recording medium.

The present invention is a recording medium reproducing method, comprising the steps of demodulating data which has been read from a recording medium, performing an error correcting process for the demodulated data, converting the data for which the error correcting process has been performed into a predetermined data format, distributing the converted data in the unit of a predetermined number of bits, adaptively decoding data in the unit of the predetermined number of bits which has been distributed, performing a time difference decoding process for the data which has been adaptively decoded so as to generate a second channel signal and a difference signal which is the difference between a first channel signal and the second channel signal, adding the second channel signal and the difference signal, and generating the first channel signal as an output signal.

According to the present invention, using "stereo correlation" and "time base correlation", high order bits of data are biased to data of "0" and encoded with a reversible code. The data is divided into a high order bit data group, which tends to be biased to data of "0" and a low order bit data group, which tends to become random numbers and encoded with a reversible code.

Reversible encoding is performed with a Huffman code. A pre-process is performed with an LZ code.

With a reversible code, data is compressed using the biasing of the data. Thus, the high order bit data group, which tends to be biased to data of "0", can be efficiently compressed. In addition, in LZ code encoding, when "0" whose occurrence probability is high is placed at the beginning of data, the compression efficiency can be improved.

Since the low order bit data group is random numbers, the compression rate becomes low. However, when the data is encoded, the code amount of the data which has been encoded is compared with the code amount of the original data which has not been encoded. The data whose code amount is smaller is output. Thus, the code amount of data can be prevented from increasing in the encoding process.

In addition "stereo correlation" and "time base correlation" can be accomplished by a simple arithmetic device. In addition, Huffman code encoding can be easily performed. Thus, both an encoding process and an decoding process can be performed at high speed.

BRIEF DESCRIPTION OF DRAWINGS

FIG. 6 is a schematic diagram for explaining a data arranging portion of the reversible code encoding circuit according to the present invention;

FIG. 7A and FIG. 7B are schematic diagrams for explaining an encoding portion using LZ SS;

FIG. 8 is a block diagram showing an example of a reversible code decoding circuit according to the present invention;

BEST MODES FOR CARRYING OUT THE INVENTION

Figure 1:
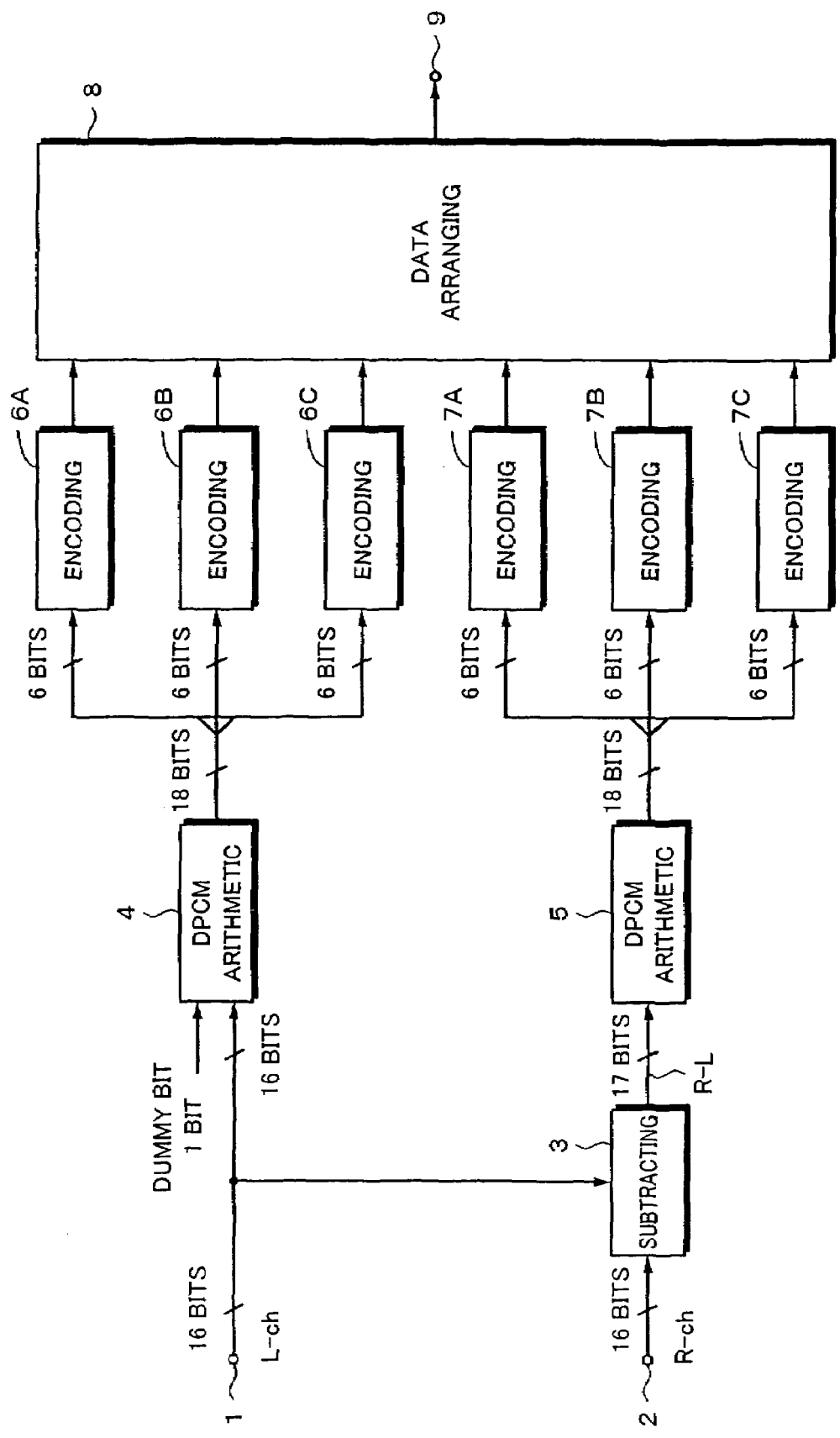
FIG. 1 is a block diagram showing an example of a reversible code encoding circuit according to the present invention.

Next, with reference to the accompanying drawings, an embodiment of the present invention will be described. The present invention applies to compression encoding for a PCM audio signal with a reversible code. Since the compression using a reversible code is free of a data loss, when a PCM audio signal is reversibly encoded, the audio quality thereof does not deteriorate.

The compression using a reversible code (hereinafter simply referred to as reversible compression) uses the biasing of data and removes a meaningless code so as to compress the data. Thus, when the compression encoding is performed with a reversible code, the more data is biased, the more efficiently the data can compressed.

In contrast, a PCM audio signal for music is a digitized signal of natural analog information. Thus, a PCM audio signal is basically close to random numbers. Thus, a PCM audio signal cannot be efficiently compressed with a reversible code. In particular, it is said that the low order bits of a PCM audio signal are all random numbers. To improve the efficiency of the compression of the reversible encoding, it is necessary to bias data of the PCM audio signal in some manner.

According to the embodiment of the present invention, using "stereo correlation" and "time base correlation" which are peculiar to music, data is biased. Next, this feature will be practically described.

For example, in a PCM audio signal of stereo music, left and audio signals have a correlation. Thus, when the difference between the left PCM audio signal and the right PCM audio signal is obtained, the absolute values of the data become small. The high order bits of the difference data are almost "0". When the difference between the left PCM audio signal and the right PCM audio signal which have a correlation is obtained, data of the difference bits is biased to around "0". This is an example of which data is biased using "stereo correlation".

Likewise, in a PCM audio signal for music, adjacent samples of data have a correlation. Thus, when the difference between adjacent samples of data is obtained, the absolute values of the difference data become small. The high order bits of the difference data become around "0". This is an example of which data is biased using "time base correlation".

When "stereo correlation" and "time base correlation" are used, the high order bits of the difference data become almost "0". As a result, since the data is biased, it can be efficiently compressed.

However, in this case, since the low order bits of the PCM audio signal are nearly random numbers, they cannot be efficiently encoded.

Thus, according to the embodiment of the present invention, the PCM audio signal is divided into high order bits, which tend to be biased, and low order bits, which tend to become random numbers and then encoded.

When a PCM audio signal sampled with 16 bits is encoded, a difference calculation is performed using "stereo correlation" and "time base correlation". When the difference calculation is performed for 16-bit data, since two carry bits take place, the resultant data becomes 18 bits (in the difference calculation using "stereo correlation", one carry bit takes place; in the difference calculation using "time base correlation", one carry bit takes place). The 18-bit data is divided into high order bit data, which is biased to nearly "0", and low order bit data, which are random numbers. The 18 bits are divided into groups of (10 bits+8 bits), groups of (6 bits+6 bits+6 bits), or the like.

When each of the divided groups is encoded with a reversible code, the high order bit group, which is biased to data of "0", can be efficiently compressed.

Since the low order bits are random numbers, when they are encoded with a reversible code, the code amount may increase.

Thus, according to the embodiment of the present invention, the code amount of data which has not been encoded is compared with the code amount of data which has been encoded for each group. When the code amount of data which has been encoded is larger than the code amount of data which has not been encoded, the original data which has not been encoded is used.

Since one channel is a DPCM (Differential Pulse Code Modulation) signal and the other channel is a stereo-difference DPCM signal, data of the left channel and data of the right channel are biased in different manners. Thus, the left and right channels are treated as different groups.

In the example, to more effectively compress a Huffman code, as a pre-process, encoding is performed with for example an LZ 77 code. The output data of the LZ 77 code encoding is arranged in the same manner as original data which is likely to have higher occurrence probability so that the next Huffman code encoding can be efficiently performed. In other words, since the original data is biased to around "0", the output of the LZ 77 code encoding is arranged so that as many codes of which high order bits are "0" are output as possible.

When data is encoded with an LZ 77 code, there are three types of output data which are "position of longest match in slide dictionary", "length of match", and "next not-match data". "position of longest match in slide dictionary" tends to have a large data length and dispersed values. In other words, with "position of longest match in slide dictionary", it is difficult to generate values near "0". In contrast, since "length of match" is generally biased to small values, the high order bits tend to become "0". Thus, "length of match" is placed at the high order bits and "position of longest match in slide dictionary" at the low order bits.

In other words, a PCM audio signal for music is encoded with a reversible code in the following manner.

(1) Stereo PCM audio signals of R (right) channel and L (left) channel are block-segmented in a predetermined unit. In this example, 1024 samples compose one block.

(2) PCM data of one channel (for example, R channel) is replaced with stereo difference data (R-L).

(3) Data of both the channels is DPCM modulated.

(4) Data of both the channels is divided into a plurality of blocks. Data of each block is divided into a plurality of groups.

(5) Each group is encoded with variable length codes using an LZ 77 code and a Huffman code.

(6) For each group, the size of data which has not been encoded is compared with the size of data which has been encoded. The data whose size is larger is used.

(7) Encoded data of each group is arranged in a predetermined sequence and output.

As shown in for example FIG. 1, the reversible code encoding circuit according to the present invention comprises a subtracting device 3 which obtains the difference between PCM audio data of L channel and PCM audio data of R channel, DPCM arithmetic devices 4 and 5 which perform DPCM for data of both the channels, encoding portions 6A, 6B, 6C, 7A, 7B, and 7C which divide data of both the channels into a plurality of groups and perform LZ 77 code encoding and Huffman code encoding for the divided groups, and a data arranging portion 8 which arranges the encoded groups in a predetermined order and outputs the arranged data.

In FIG. 1, an L channel PCM audio signal which has been quantized with for example 16 bits is supplied to an input terminal 1. An R channel PCM audio signal which has been quantized with for example 16 bits is supplied to an input terminal 2. These PCM audio signals are input as blocks each of which is composed of 1024 samples.

The L channel PCM audio signal supplied from the input terminal 1 is supplied to not only the subtracting device 3 but the DPCM arithmetic device 4. The R channel PCM audio signal supplied from the input terminal 2 is supplied to the subtracting device 3.

The subtracting device 3 decrease the absolute values of data using the forgoing "stereo correlation" so as to bias the data to "0". The subtracting device 3 obtains the difference between the R channel PCM audio signal and the L channel PCM audio signal. An output signal of the subtracting device 3 is supplied to the DPCM arithmetic device 5.

When the subtracting device 3 obtains the difference between 16-bit PCM audio data of R channel and 16-bit PCM audio data of L channel, using "stereo correlation", a carry bit takes place. As a result, the output data of the subtracting device 3 becomes for example 17 bits.

Since the input data of the DPCM arithmetic device 5, namely the number of bits of the output data of the subtracting device 3 is 17 bits, to match the number of bits of the input data of the DPCM arithmetic device 5 with the number of bits of the input data of the DPCM arithmetic device 4, one dummy bit is input to the DPCM arithmetic device 4. The resultant 17-bit PCM audio signal of L channel is supplied to the DPCM arithmetic device 4.

The DPCM arithmetic devices 4 and 5 perform difference encoding so as to decrease the absolute values of data using the forgoing "time base correlation" and bias the data to "0".

The DPCM arithmetic device 4 obtains the difference between adjacent samples of the input PCM data of L channel. Using "time base correlation", since one carry bit takes place, the output data of the DPCM arithmetic device 4 becomes 18 bits. The output data of the DPCM arithmetic device 4 is divided into a high order 6-bit group, a middle order 6-bit group, and a low order 6-bit group and supplied to the encoding portions 6A, 6B, and 6C, respectively.

Likewise, the DPCM arithmetic device 5 obtains the difference between adjacent samples of data of (R-L) channel. Output data of the DPCM arithmetic device 5 is 18 bits. The 18-bit data is divided into for example a high order 6-bit group, a middle order 6-bit group, and a low order 6-bit group and supplied to the encoding portions 7A, 7B, and 7C, respectively.

Figure 2:
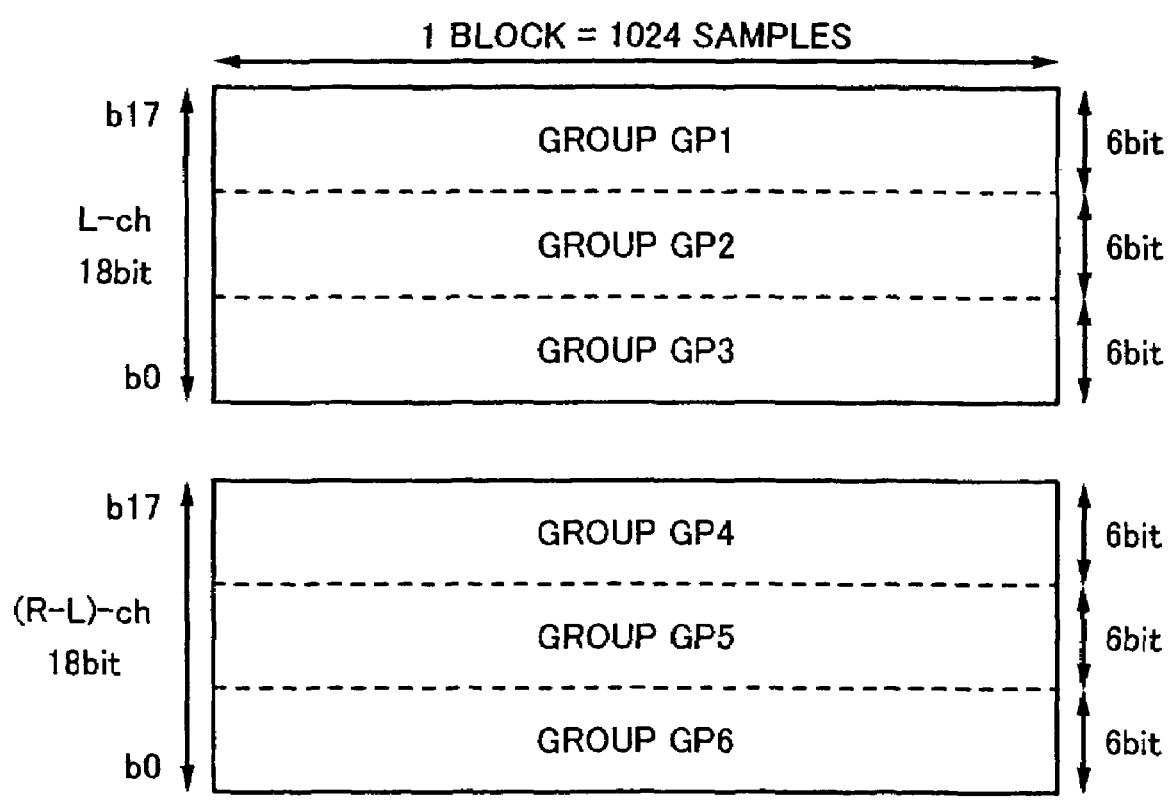
FIG. 2 is a schematic diagram for explaining an example of the reversible code encoding circuit according to the present invention.

In other words, as shown in FIG. 2, the DPCM arithmetic device 4 outputs 18 bits (b0 to b17) of L channel. The high order 6 bits (b12 to b17) of the 18 bits are supplied as a group GP1 to the encoding portion 6A. The middle order 6 bits (b6 to b11) are supplied as a group GP2 to the encoding portion 6B. The low order 6 bits (b0 to b5) are supplied as a group GP3 to the encoding portion 6C.

A PCM audio signal has a time base correlation. The DPCM arithmetic device 4 calculates the difference between adjacent samples of the PCM audio signal. Thus, the high order bits of the output of the DPCM arithmetic device 4 are almost "0". In other words, the data of the group GP1 is almost "0". Likewise, the data of the group GP2 is almost "0". The low order bit group GP3 is likely random numbers.

As shown in FIG. 2, the DPCM arithmetic device 5 outputs 18-bit (b0 to b17) of (R-L) channel. The high order six bits (b12 to b17) of the 18 bits are supplied as a group GP4 to the encoding portion 7A. The middle order six bits (b6 to b11) are supplied as a group GP5 to the encoding portion 7B. The low order six bits (b0 to b5) are supplied as a group GP6 to the encoding portion 7C.

Since a PCM audio signal has a stereo correlation, the high order bits of the output of the subtracting device 3 are almost "0". In addition, since a PCM audio signal has a time base correlation, the high order bits of the output of the DPCM arithmetic device 5 comes to "0". Thus, the data of the group GP4 is almost "0". The data of the group GP5 comes to "0". The data of the low order bit group GP6 is likely random numbers.

The encoding portions 6A to 6C and the encoding portion 7A to 7C reversibly encode six-bit data each. Compression-encoding is performed with for example a Huffman code. As the pre-process, for example an LZ 77 code is used.

Figure 3:
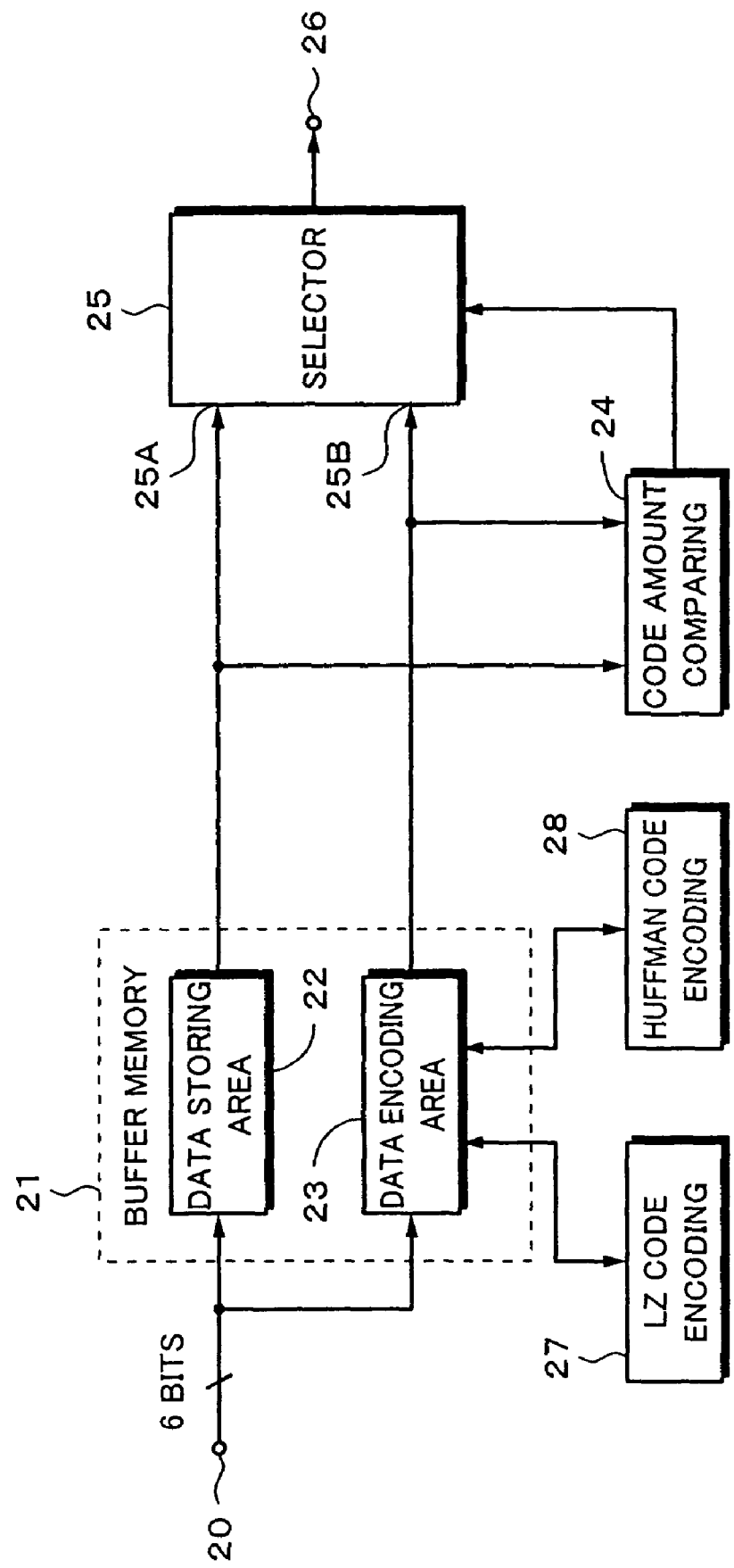
FIG. 3 is a block diagram showing an example of an encoding portion of the reversible code encoding circuit according to the present invention.

FIG. 3 shows the structure of each of the encoding portions 6A to 6C and the encoding portions 7A to 7C. In FIG. 3, each six-bit group of data is supplied from an input terminal 20 to a buffer memory 21 in such a manner that 1024 samples compose one block. The buffer memory 21 has a data storing area 22 and a data encoding area 23.

The data storing area 22 is an area in which six-bit 1024-sample data is stored until it has been encoded. The data encoding area 23 is a work area in which the six-bit 1024-sample data is encoded.

In association with the data encoding area 23, an LZ code encoding arithmetic portion 27 and a Huffman code encoding arithmetic portion 28. The LZ code encoding arithmetic portion 27 encodes data with for example an LZ 77 code so that the data can be efficiently encoded with an Huffman code. The Huffman code encoding arithmetic portion 28 encodes data with a Huffman code, which is a variable length code.

In the LZ 77 code encoding process, a buffer which stores data sequences immediately followed by and preceded by a data sequence which is being encoded is provided. The buffer is used as a dictionary. With the buffer, data is compression-encoded. As data is encoded, the data sequence stored in the buffer is slid.

Thus, this buffer is referred to as slide dictionary.

In the LZ 77 code encoding process, the slide dictionary is searched for the longest data sequence which matches a data sequence at which the encoding process is started. After the slide dictionary has been searched for the longest data sequence which matches a data sequence, the start position and the length of the longest data sequence in the slide dictionary are obtained. With an LZ 77 code, "position of longest match in slide dictionary", "length of match", and "non-match data" are output data.

Figure 4:
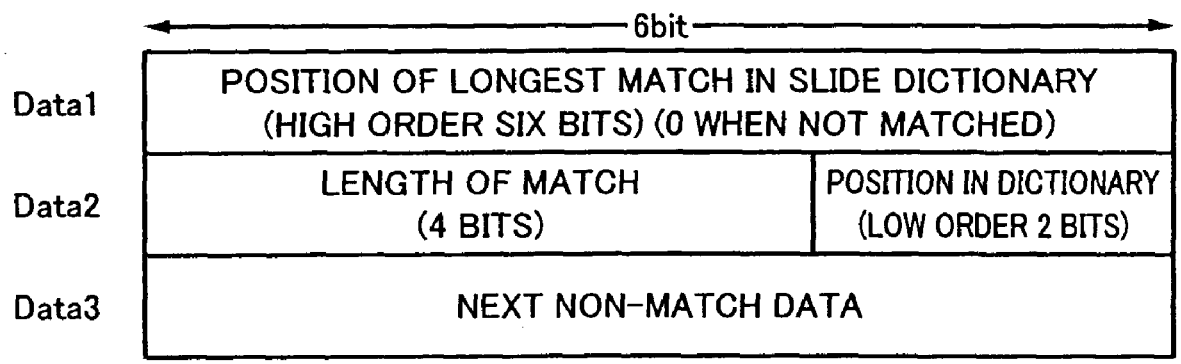
FIG. 4 is a schematic diagram for explaining an encoding portion using LZ 77.

FIG. 4 shows a data format of which six-bit data has been encoded with an LZ 77 code. As shown in FIG. 4, when six-bit data is encoded with an LZ 77 code, three six-bit groups (Data 1, Data 2, and Data 3) are output. "Position of longest match in slide dictionary" is obtained with eight bits. The data length of "position of longest match in slide dictionary" is the largest in the three. Thus, the values of "position of longest match in slide dictionary" tend to disperse and become random numbers. "Length of match" is obtained with four bits. Since "length of match" is biased to small values, the high order bits thereof tend to become "0". "Next non-match data" is six-bit data itself.

As shown in FIG. 4, the first six-bit data (Data 1) is allocated the high order six bits of "position of longest match in slide dictionary". When there is no match, "position of longest match in slide dictionary" is "0".

The high order four bits of the next six-bit data (Data 2) are allocated "length of match". The low order two bits of the six-bit data (Data 2) are allocated the low order two bits of "position of longest match in slide dictionary". Since "length of match" is biased to small values, the high order bits of the data (Data 2) tend to become "0".

The next six-bit data (Data 3) is allocated "next non-match data".

In FIG. 3, data which has been encoded with an LZ7 code is compression-encoded with a Huffman code by the Huffman code encoding arithmetic portion 28.

With a Huffman code, variable length code encoding is performed in such a manner that the higher occurrence probability a code has, the shorter length the code has. With a Huffman code, a code tree corresponding to the size of occurrence probability is structured. Corresponding to the tree, variable length code encoding is performed in such a manner that the higher occurrence probability a code has, the shorter length the code has. When the pre-process is performed with an LZ 77 code, Huffman code encoding can be efficiently performed.

Figure 5:
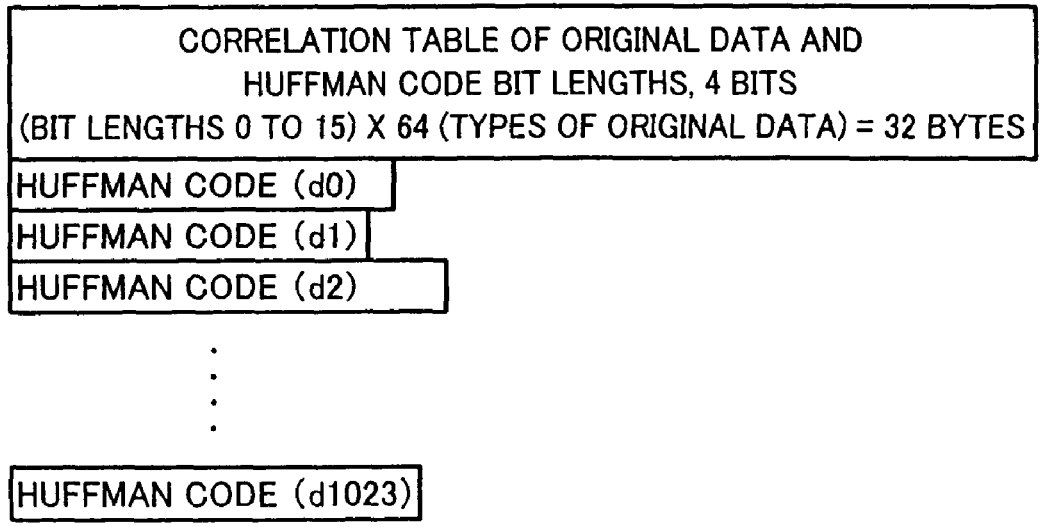
FIG. 5 is a schematic diagram for explaining the encoding portion of the reversible code encoding circuit according to the present invention.

The Huffman code encoding arithmetic portion 28 outputs data in a format as shown in FIG. 5. In other words, as shown in FIG. 5, a correlation table of original data and Huffman code bit lengths is provided for data of one group. Corresponding to the correlation table, data d0, d1, d2, ..., d1023 which have been variable length encoded with a Huffman code are output.

In such a manner, in the data encoding area 23 shown in FIG. 3, 1024 samples of data which has been reversibly encoded by the LZ code encoding arithmetic portion 27 and the Huffman code encoding arithmetic portion 28 are stored. The encoded data is supplied from the data encoding area 23 to not only a terminal 25B of a selector 25 but a code amount comparing portion 24. 1024 samples which have not been encoded and which have been stored in the data storing area 22 are supplied from the data storing area 22 to not only a terminal 25A of the selector 25 but the code amount comparing portion 24.

The code amount comparing portion 24 compares the code amount of original data which has not been encoded and which is stored in the data storing area 22 and input from the input terminal 20 with the code amount of encoded data which is stored in the data encoding area 23. The compared output of the code amount comparing portion 24 is supplied as a select control signal to the selector 25. The compared result of the code amount comparing portion 24 affects identification information which is contained in a block header (which will be described later) and which represents whether or not the data has been encoded.

Since the code amount of data which has not been encoded is known, the code amount of data which has been encoded may be compared with the code amount of known data which has not been encoded.

When the compared result of the code amount comparing portion 24 represents that the code amount of data which has been encoded is smaller than the code amount of data which has not been encoded, with a select control signal, the selector 25 is set to the terminal 25B side. Data which has been encoded with the LZ 77 code and variable length encoded with the Huffman code is read from the data encoding area 23 and output from an output terminal 26 through the selector 25.

When the compared result of the code amount comparing portion 24 represents that the code amount of data which has not been encoded is smaller than the code amount of data which has been encoded, with the select control signal, the selector 25 is set to the terminal 25A side. Data which has not been encoded is output from the data storing area 22 to the output terminal 26 through the selector 25.

As was described above, the outputs of the DPCM arithmetic devices 4 and 5 are divided into six-bit groups and compression-encoded with an reversible code by the encoding portions 6A to 6C and 7A to 7B. Among these groups, the high order bit groups GP1, GP2, GP4, and GP5 are almost data of "0". Thus, they are likely to be strongly compressed. In contrast, the low order bit groups GP3 and GP6 are random numbers. Thus, they are likely not to be strongly compressed. However, when the code amount of data which has been compressed is larger than the code amount of data which has not been compressed, since the data which has not been encoded (namely, original data) is output, the code amount of data can be prevented from increasing in the encoding process.

Output data of the encoding portions 6A to 6C and the encoding portions 7A to 7C is supplied to the data arranging portion 8. The data arranging portion 8 arranges data of the groups GP1 to GP3 and GP4 to GP6 which have been reversibly encoded by the encoding portions 6A to 6C and the encoding portions 7A to 7C in a predetermined format for each block and outputs the resultant data.

FIG. 6 shows an example of the format of data which is output from the data arranging portion 8. In FIG. 6, at the beginning, a block header is placed. The block header contains identification information which represents data length of each group, whether or not each group has been encoded, and so forth.

The block header is followed by first sample data of the block. The first sample data is used as an initial value of the DPCM encoding. The first sample data is followed by groups GP1 to GP6 which are encoded data.

As was described above, the groups GP1 and GP2 and the groups GP4 and GP5 as high order bit groups are likely to be strongly compressed. In contrast, when data of the groups GP3 and GP6 are reversibly encoded, the code amounts thereof may be increased. In this case, the original data will be output instead of the encoded data. To see if data of the groups GP1 to GP6 has been encoded with a reversible code, the identification information of the header is used.

The data arranging portion 8 shown in FIG. 1 arranges encoded data of the individual groups as shown in FIG. 6. Output data of the data arranging portion 8 is obtained from an output terminal 9. From the output terminal 9, a PCM audio signal of which one block (1024 samples) has been reversibly encoded is obtained.

In the forgoing example, each of outputs of the DPCM arithmetic devices 4 and 5 is divided into three groups of (6 bits+6 bits+6 bits). However, the present invention is not limited to such an example. Alternatively, each of outputs of the DPCM arithmetic devices 4 and 5 may be divided into two groups (10 bits +8 bits).

In the forgoing example, the encoding portions perform pre-processes with an LZ 77 code and then perform an encoding process with a Huffman code. However, the present invention is not limited to such an example. Alternatively, the encoding portions may perform an encoding process with a dynamic Huffman code, an arithmetic code, an LZ 78 code, an LZ SS code, an LZ W code, or the like.

In the example, before data is encoded with a Huffman code, a pre-process is performed with an LZ code. Alternatively, data may be encoded with only a Huffman code.

In the example, data is placed so that the high order bits of data which has been encoded with an LZ code nearly become "0". Alternatively, data may be code-inverted or bit-inverted so that the high order bits nearly become "1".

FIG. 7A and FIG. 7B show an example of the format in the case that an LZ SS code is used instead of an LZ 77 code. When the encoding process is performed with an LZ 77 code, three elements "position of longest match in slide dictionary", "length of match", and "next non-match data" are output. However, in the LZ 77 code encoding process, data which has not been compressed is contained in a code sequence. Thus, the resultant data is redundant. With an LZ SS code, the redundancy of the LZ 77 code encoding process can be removed.

When an LZ SS code is used, two cases are identified with a flag. In one case, the slide dictionary has been searched for at least three longest match codes. In the other case, the slide dictionary has not been searched for at least three longest match codes.

When an LZ SS code is used, the slide dictionary is searched for at least three longest data sequences which match a data sequence at which the encoding process is started. When the slide dictionary has been searched for a data sequence having the longest match, the flag is set to for example "1". At that point, "position of longest match in slide dictionary" and "length of match" are output. When the slide dictionary has not been searched for a data sequence having the longest match, the flag is set to for example "0". At that point, a non-match data sequence is placed.

FIG. 7A shows the data format in the case that the slide dictionary has been searched for a data sequence having the longest match. When the slide dictionary has been searched for a data sequence having the longest match, the flag of the first seven-bit data (Data 1) is set to "1". Thereafter, the high order six bits of "position of longest match in slide dictionary" are placed.

At the beginning of the next seven-bit data (Data 2), "0" is placed as the flag. The flag is followed by "length of match" of four bits. Since "length of match" is biased to small values, the high order bits of the data (Data 2) tend to be "0". Although the flag of the data (Data 2) is meaningless, since the high order bits of "length of match" nearly become "0", they are always set to "0" so that they are biased to "0". The low order two bits of the seven-bit data (Data 2) are allocated the low order two bits of "position of longest match in slide dictionary".

FIG. 7B shows the case that the slide dictionary has not been searched for a data sequence which has the longest match. When the slide dictionary has not been searched for a data sequence having the longest match, as shown in FIG. 7B, the flag is set to "0". The flag is followed by the non-match data of six bits.

In the reversibly encoding circuit according to the present invention, using "stereo correlation" and "time base correlation", data is biased so that the data is efficiently reversibly compressed.

A reversible code decoding process is performed in the reverse manner as the forgoing encoding process. In other words, the decoding process is performed in the following manner.

(1) Encoded data is distributed into groups in a predetermined order.

(2) Each group is decoded with a Huffman code and an LZ 77 code. When data is decoded, the code amount increases. Thus, when data has not been encoded, these processes are not performed.

(3) Data of each of both channels is DPCM demodulated.

(4) Data of L channel is added to data of (R-L) channel so as to obtain data of R channel.

(5) Decoded data of L and R channels is output.

FIG. 8 shows the structure of the decoding circuit. The decoding circuit comprises a data distributing portion 52 which distributes data to individual groups, decoding portions 53A, 53B, 53C, 54A, 54B, and 54C which decode individual groups with a Huffman code and an LZ 77 code, DPCM demodulating devices 55 and 56 which perform DPCM demodulating for both channels, and an adding device 57 which adds a signal of (R-L) channel and a signal of L channel and generates a signal of R channel.

In FIG. 8, encoded data which has been reversibly encoded by the encoding circuit shown in FIG. 1 and which has been sent in the format shown in FIG. 6 is supplied to an input terminal 51. The encoded data (namely, the output data of the data arranging portion 8) contains the groups GP1 to GP3 and GP4 to GP6 which have been arranged as shown in FIG. 6.

Data which is input from the input terminal 51 is supplied to the data distributing portion 52. The data distributing portion 52 divides the encoded data into the groups GP1 to GP3 and GP4 to GP6.

The groups GP1, GP2, and GP3 are supplied to the decoding portions 54A, 54B, and 54C, respectively. The groups GP4, GP5, and GP6 are supplied to the decoding portions 54A, 54B, and 54C, respectively.

The decoding portions 53A to 53B and 54A to 54C perform Huffman code decoding and LZ 77 code decoding. The decoding portions 53A to 53B obtain high order six bits, middle order six bits, and low order six bits of DPCM data of L channel as decoded data. The decoding portions 54A to 54C obtain high order six bits, middle order six bits, and low order six bits of PCM data of (R-L) channel as decoded data.

As was described above, in the case that the code amount of data which has been encoded was larger than the code amount of original data which has not been encoded, the encoding has not been performed. To see if data has been encoded can be judged with identification information of the block header. When the identification information represents that data has not been encoded, the decoding portion 53A to 53B and 54A to 54C do not perform the decoding process.

Data composed of output data of the decoding portion 53A, output data of the decoding portion 53B, and output data of the decoding portion 53C is supplied to the DPCM demodulating device 55. The DPCM demodulating device 55 adds differences of adjacent samples of data and obtains a PCM audio signal of L channel as decoded data. The PCM audio signal of L channel is supplied to not only an output terminal 58 but the adding device 57.

Data composed of output data of the decoding portion 54A, output data of the decoding portion 54B, and output data of the decoding portion 54C is supplied to the DPCM demodulating device 56. The DPCM demodulating device 56 adds differences of adjacent samples of data and outputs a PCM audio signal of (R-L) channel as decoded data. The PCM audio signal of (R-L) channel is supplied to the adding device 57.

The adding device 57 adds the PCM audio signal of L channel demodulated by the DPCM demodulating device 55 and the PCM audio signal of (R-L) channel demodulated by the DPCM demodulating device 56. As a result, a PCM audio signal of R channel is generated. The PCM audio signal of R channel is output from an output terminal 59.

As described above, the decoding circuit shown in FIG. 8 can be accomplished by a circuit which performs a reverse process of the encoding circuit shown in FIG. 1. Using "stereo correlation" and "time base correlation", an encoding process and a decoding process can be performed by a simple arithmetic device. By the arithmetic device, Huffman code encoding and decoding process can be easily performed. Thus, the encoding process and the decoding process can be performed at high speed.

The forgoing reversibly encoding circuit and decoding circuit can be used to record music data which is in the CD-ROM format and which has the same duration as one CD-DA disc.

Figure 9:
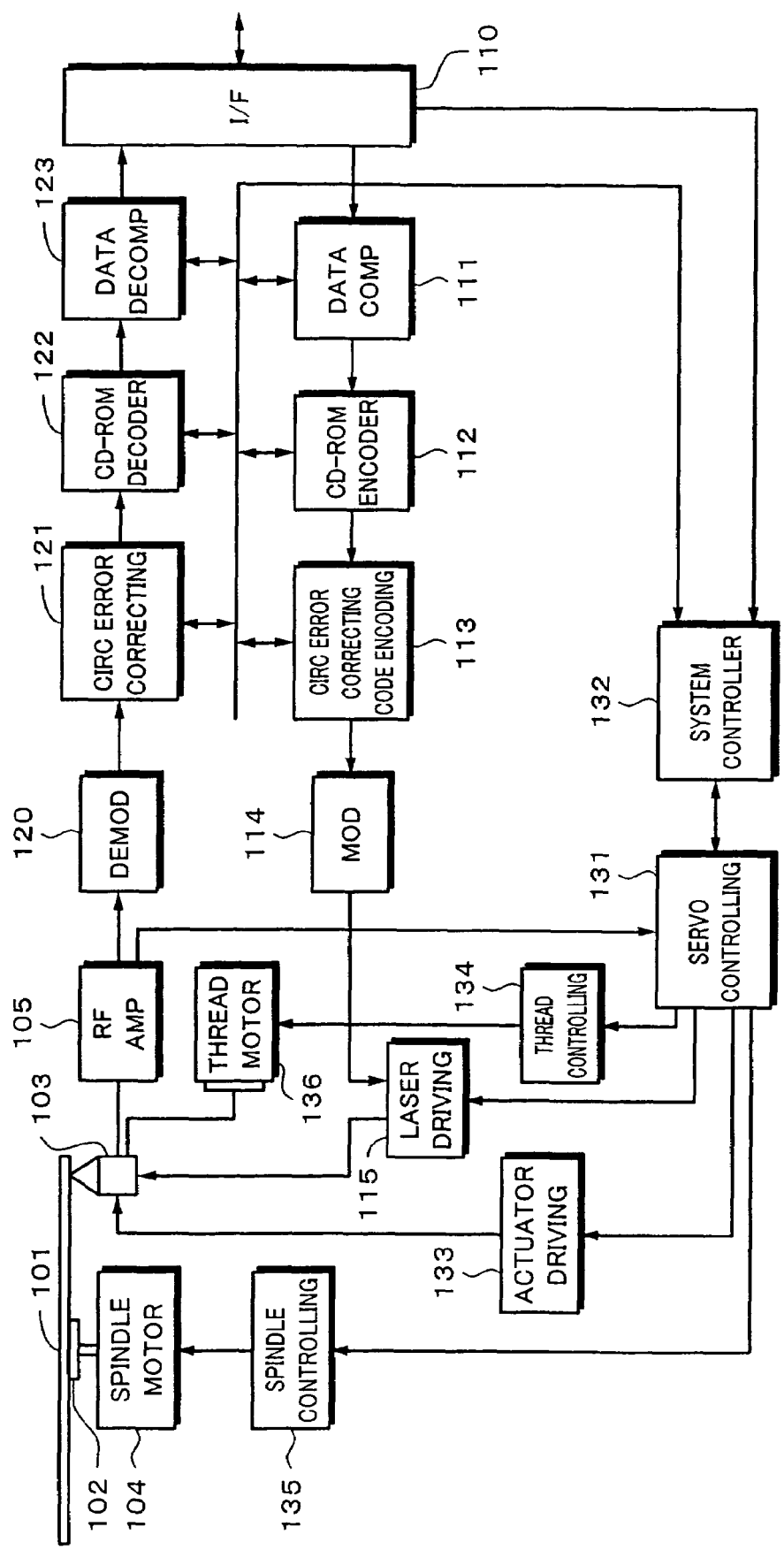
FIG. 9 is a block diagram showing an example of an optical disc recording and reproducing apparatus according to the present invention.

FIG. 9 is a block diagram showing an outline of an optical recording and reproducing apparatus according to the present invention. In FIG. 9, reference numeral 101 represents an optical disc. The optical disc 101 is an optical disc which is referred to as a CD-DA disc, a CD-ROM disc, a CD-R (Compact Disc Recordable) disc, or a CD-RW (Compact Disc ReWritable) disc, has a diameter of 120 mm, and has a center hole. The optical disc 101 may be a so-called CD single which has a diameter of 80 mm.

The optical disc 101 may be a reproduction only disc such as a CD-DA disc or a CD-ROM disc, a write once type disc such as a CD-R disc, or a rewritable disc such as a CD-RW disc. In a reproduction only disc, aluminum is used as the recording layer. In the reproduction only disc, a disc substrate is normally formed with a stamper. On the formed substrate, a reflecting film is formed as a recording layer made of aluminum. On the reproduction only disc, music data and various types of data have been recorded.

A CD-R disc, which is a write once type disc, has a recording layer made of an organic color matter such as phthalocyanine or cyanine. When data is written to the CD-R disc, the temperature of the organic color matter on the disc is raised by laser light. As a result, the organic color phase is thermally deformed and thereby data is recorded.

A CD-RW disc, which is a rewritable disc, has a recording layer made of a phase change material. The phase change material is for example an alloy of Ag—In—Sb—Te (silver—indium—antimony—tellurium). Such a phase change material has a crystal phase and an amorphous phase. When the intensity of laser light as a light beam is strong, the temperature of the phase change recording film is raised over the melting point and then quickly lowered. At that point, the recording film made of the phase change material becomes the amorphous state. When the intensity of the laser light as a light beam is relatively weak, the temperature of the recording film made of the phase change material is raised to around the crystallizing temperature and then gradually lowered. As that point, the recording film becomes the crystal state. Laser light is generated as pulses corresponding to data to be recorded. The generated laser is radiated to the recording layer. At that point, the recording layer is partly changed from the crystal state to the amorphous state. As a result, data is recorded.

Figure 10A:
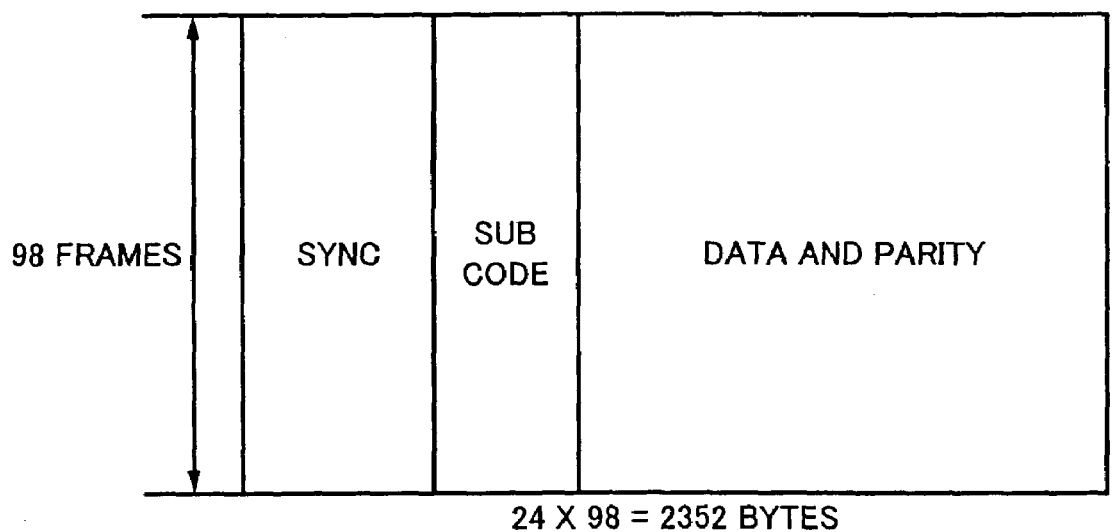
FIG. 10A and FIG. 10B are schematic diagrams for explaining a recording format of an optical disc.

In a music CD-DA disc, one sample or one word composes 16 bits and the sampling frequency is 44.1 kHz. 16 bits of one sample or one word are divided into two symbols which are high order eight bits and low order eight bits. An error correction code encoding process and an interleaving process are performed in the unit of one symbol. 24 symbols of audio data compose one frame. One frame is equivalent to six samples of each of stereo left and right channels. 98 frames compose one block. Data is accessed in the unit of one block. Thus, as shown in FIG. 10A, the data capacity for one block is (24×98=2352 bytes).

Figure 10B:
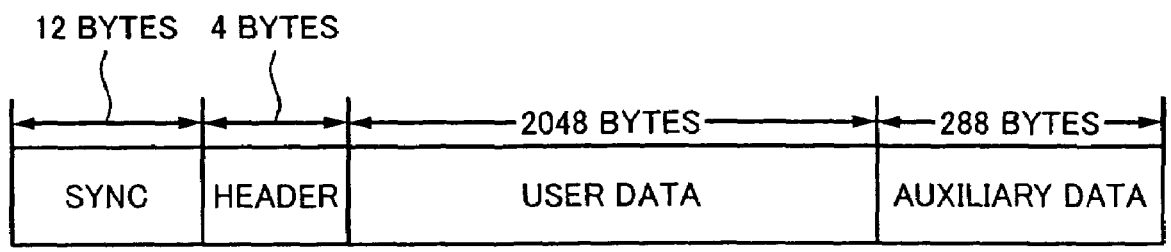

In contrast, when data is recorded in the CD-ROM format, to improve the error correcting capability, as shown in FIG. 10B, auxiliary data of 288 bytes is placed in one block. In addition, at the beginning of one block, a sync of 12 bytes and a header of four bytes are placed. Thus, the capacity of user data of one block becomes 2048 bytes.

According to the present invention, with a reversible code, music data which is in the CD-ROM format and which has the same duration as one CD-DA disc can be recorded and reproduced to and from the optical disc 101.

In FIG. 9, the optical disc 101 is held on a turn table 102. The turn table 102 is rotated and driven at constant linear velocity (CLV) or constant angular velocity (CAV) by a spindle motor 104. The turn table 102 is disposed at an edge side of a rotating shaft of the spindle motor 104. As the spindle motor 104 is rotated, the turn table 102 is rotated and the optical disc 101 is rotated.

An optical pickup 103 focuses laser light as a light beam of a semiconductor laser device on a recording layer of the optical disc 101 through an objective lens (not shown) and traces tracks concentrically or spirally formed on the optical disc 101. The objective lens is held by an actuator so that the objective lens can be traveled in focus direction and tracking direction. In addition, the whole optical pickup 103 is traveled in radial direction of the disc by a thread mechanism (not shown) whose drive source is a thread motor 136. As a result, the optical disc 101 is scanned with laser light radiated from the optical pickup 103 from the innermost circumferential position to the outermost circumferential position.

In addition to the objective lens and the actuator, the optical pickup 103 has an optical system which guides laser light emitted from the semiconductor laser device to the objective lens and separates laser light reflected by the optical disc 101 and a photo detector which receives light separated by the optical system and reflected from the optical disc 101.

In other words, laser light emitted from the semiconductor laser device is collimated by a collimator lens which composes the optical system. The collimated laser light is entered into a beam splitter which composes the optical system. The laser light which has passed through the beam splitter is focused on the recording layer by the objective lens and radiated as a light spot on the optical disc 101. After passing through the objective lens, the laser light reenters the beam splitter. The laser light is reflected by the beam splitter and then focused on the photo detector by a condenser lens. The photo detector photoelectrically converts the received light into a received photocurrent.

The photocurrent received from the photo detector is supplied as an output signal of the optical pickup 103 to an RF amplifier 105. The RF amplifier 105 has a current—voltage converting circuit, an amplifying circuit, a matrix circuit (RF matrix amplifier), and so forth. The RF amplifier 105 generates various types of signals corresponding to an output signal of the optical pickup 103. The RF amplifier 105 generates for example an RF signal as a reproduction signal, a focus error signal and a tracking error signal as servo controlling signals.

A servo controlling circuit 131 generates various servo signals or drive signals for a focus servo, a tracking servo, a thread servo, and a spindle servo corresponding to a focus error signal and a tracking error signal supplied from the RF amplifier 105 and an operation command supplied from a system controller 132 and outputs the generated signals to an actuator driving circuit 133, a thread controlling circuit 134, and a spindle controlling circuit 135.

The thread controlling circuit 134 drives the thread motor 136 corresponding to the thread drive signal. The thread motor 136 travels the whole optical pickup 103 in the radial direction of the optical disc 101. The thread controlling circuit 134 drives the thread motor 136 corresponding to the thread drive signal so that the optical pickup 103 is properly traveled in the radial direction of the optical disc 101.

When data is recorded on the optical disc 101, the data is supplied from an external apparatus through an interface 110. When for example music data is recorded on the optical disc 101, a stereo music PCM audio signal which has been sampled at a frequency of 44.1 kHz and quantized with 16 bits is supplied through the interface 110. In the example, it is assumed that such music data is recorded in the CD-ROM format as shown in FIG. 10B.

The PCM audio signal which has been input through the interface 110 is supplied to a data compressing circuit 111. The data compressing circuit 111 reversibly compresses the PCM audio signal so that data in the CD-ROM format can has the same duration as one CD-DA disc. As the data compressing circuit 111, the encoding circuit shown in FIG. 1 is used.

The data compressing circuit 111 compression-encodes the PCM audio signal with a reversible code. Output data of the data compressing circuit 111 is supplied to a CD-ROM encoder 112. In addition to a sync and a header, the CD-ROM encoder 112 adds auxiliary data for an error correcting process to one block data so that the PCM audio signal has the CD-ROM format shown in FIG. 10B.

Output data of the CD-ROM encoder 112 is supplied to an error correction code encoding circuit 113. The error correction code encoding circuit 113 performs an error correction code encoding process with CIRC (Cross Interleave Reed-Solomon).

Output data of the error correction code encoding circuit 113 is supplied to a modulating circuit 114. The modulating circuit 114 perform EFM (8 to 14 Modulation) for the output data of the error correction code encoding circuit 113. Output data of the modulating circuit 114 is supplied to a laser driving circuit 115. The laser driving circuit 115 modulates a laser waveform and generates a semiconductor laser device drive signal which is a combination of a predetermined record level and a predetermined erase level. Corresponding to the semiconductor laser device drive signal, the beam intensity of the laser light radiated by the optical pickup 103 is modulated. As a result, data is recorded on the optical disc 101.

When data recorded on the optical disc 101 is reproduced, the data is read from the optical disc 101 by the optical pickup 103. An output signal of the optical pickup 103 is supplied to the RF amplifier 105. An RF signal generated by the RF amplifier 105 is waveform equalized by an equalizer. An output signal of the equalizer is digitized in a predetermined slice level. A demodulating circuit 120 performs EFM demodulating.

Output data of the demodulating circuit 120 is supplied to an error correcting process circuit 121. The error correcting process circuit 121 performs an error detecting and correcting process with CIRC. Output data of the error correcting process circuit 121 is supplied to a CD-ROM decoder 122. In addition, the CD-ROM decoder 122 performs an error correcting process and reproduces data from the optical disc 101.

As was described above, since a reversibly encoded stereo PCM audio signal has been recorded on the optical disc 101, the CD-ROM decoder 122 outputs the reversibly encoded stereo PCM audio signal.

An output of the CD-ROM decoder 122 is supplied to a data decompressing circuit 123. The data decompressing circuit 123 performs a process corresponding to the data compressing circuit 111 of the recording apparatus. The data decompressing circuit 123 is composed of for example the decoding circuit shown in FIG. 8. The data decompressing circuit 123 performs a reversible code decoding process. The data decompressing circuit 123 obtains the stereo PCM audio signal as a decoded signal. Since the reversible compression is performed, the original data can be perfectly reproduced.

The stereo PCM audio signal decompressed by the data decompressing circuit 123 is output to an external apparatus through the interface 110.

Using the reversible code according to the present invention, when music data is recorded in for example the CD-ROM format, the same record duration as one CD-DA disc can be accomplished. Since music data has been compressed with a reversible code, the audio quality thereof is not deteriorated.

In the forgoing example, the optical disc is a disc based on a CD. Alternatively, the optical disc may be a DVD (Digital Versatile Disc or Digital Video Disc) or a disc based on a DVD such as a DVD-RAM disc, a DVD-R disc, or a DVD-RW disc. Various types of optical discs such as a double density CD having the same shape as a CD and has an increased record capacity, an optical disc which is affinity with a conventional CD player and a personal computer have been developed. The present invention can be applied to those discs.

Of course, in the reversibly encoding system according to the present invention, a PCM audio signal can be recorded in the CD-ROM format. In addition, the present invention can be applied to the cases that music data is transferred through a network and that music data is recorded on a recording medium such as a magnetic disc or a magneto-optical disc.

According to the present invention, using "stereo correlation" and "time base correlation", high order bits of data are biased to "0" and reversibly encoded. Data is divided into a high order bit group, which tends to be biased to "0", and a low order bit group, which tends to become random numbers and reversibly encoded.

In the reversibly encoding, a Huffman code is used. As a pre-process, an LZ code is used.

With a reversible code, data is compressed using the biasing thereof. Thus, a high order bit data group, which tends to be biased to "0", can be efficiently compressed. With an LZ code, when "0" which has a higher occurrence probability is placed at the beginning, the data can be efficiently compressed.

Since low order bits are random numbers, the compression rate is low. However, when data is encoded, the code amount of data which has not been compressed is compared with the code amount of data which has been compressed. Data with the smaller code amount is output. Thus, the code amount can be prevented from increased in the encoding process.

In addition, "stereo correlation" and "time base correlation" can be structured with a simple arithmetic device. In addition, since Huffman code encoding can be easily performed, the encoding process and the decoding process can be performed at high speed.

INDUSTRIAL UTILIZATION

As was described above, the encoding apparatus and method and the decoding apparatus and method according to the present invention allow PCM audio signal such as music data to be suitably compressed by reversibly encoding.

| DESCRIPTION OF REFERENCE NUMERALS | |
| --- | --- |
| 3 | SUBTRACTING DEVICE |
| 4, 6 | DPCM ARITHMETIC DEVICE |
| 6A TO 6C, | ENCODING PORTION |

-continued

| | DESCRIPTION OF REFERENCE NUMERALS |
|---|---|
| 7A TO 7C | |
| 8 | DATA ARRANGING PORTION |
| 27 | LZ CODE ENCODING ARITHMETIC PORTION |
| 28 | HUFFMAN CODE ENCODING ARITHMETIC PORTION |

The invention claimed is:

1. An encoding apparatus, comprising:
a difference signal generating portion for forming a difference signal which is the difference between a first channel signal and a second channel signal of an input PCM signal;
a time difference encoding process portion for encoding the difference signal and the second channel signal with a time difference;
a dividing process portion for dividing an output signal of the time difference encoding process portion in the unit of a predetermined number of bits;
an adaptively encoding process portion for adaptively encoding output data of the dividing process portion in the unit of the predetermined number of bits; and
an output portion for arranging output data of the adaptively encoding process portion in a predetermined format;
wherein the adaptively encoding process portion is configured to compare the code amount of data for which an adaptively encoding process has not been performed with the code amount of data for which an adaptively encoding process has been performed in the unit of the predetermined number of bits and output data whose code amount is smaller,
wherein the adaptively encoding process portion includes,
a pre-process portion for performing a pre-process with a first reversible code,
an encoding process portion for performing an encoding process with a second reversible code corresponding to output data of the pre-process portion, and
a comparing portion for comparing the code amount of output data of the encoding process portion with the code amount of input data of the encoding process portion.

2. The encoding apparatus as set forth in claim 1,
wherein the time difference encoding process portion has:
a first time difference encoding portion for encoding the difference signal with the time difference; and
a second time difference encoding portion for encoding the second channel signal with the time difference.

3. The encoding apparatus as set forth in claim 2,
wherein the second time difference encoding portion is configured to receive one dummy bit.

4. The encoding apparatus as set forth in claim 1,
wherein the dividing process portion is configured to divide the output signal of the time difference encoding process portion into at least high order bit data and low order bit data.

5. The encoding apparatus as set forth in claim 1,
wherein the dividing process portion is configured to divide the output signal of the time difference encoding process portion into at least high order bit data, middle order bit data, and low order bit data.

6. The encoding apparatus as set forth in claim 1,
wherein the adaptively encoding process portion is configured to perform an encoding process with a reversible code.

7. The encoding apparatus as set forth in claim 6,
wherein the adaptively encoding process portion is configured to perform an adaptively encoding process with a variable length code.

8. The encoding apparatus as set forth in claim 1,
wherein the pre-process portion is configured to perform the pre-process with a universal code as the first reversible code.

9. The encoding apparatus as set forth in claim 8,
wherein the output portion is configured to add identification information which represents whether or not the output data has been encoded by the adaptively encoding process portion in the unit of the predetermined number of bits and output the resultant data.

10. The encoding apparatus as set forth in claim 1,
wherein the difference signal forming portion is configured to form the difference signal using a stereo correlation of the first channel signal and the second channel signal.

11. An encoding method, comprising:
forming a difference signal which is the difference between a first channel signal and a second channel signal of an input PCM signal;
encoding the difference signal and the second channel signal with a time difference;
dividing a signal which has been encoded with the time difference in the unit of a predetermined number of bits;
adaptively encoding the divided data in the unit of the predetermined number of bits; and
arranging the adaptively encoded data in a predetermined format;
wherein the adaptively encoding process step is performed by comparing the code amount of data for which an adaptively encoding process has not been performed with the code amount of data for which an adaptively encoding process has been performed in the unit of the predetermined number of bits and outputting data whose code amount is smaller;
wherein the adaptively encoding process step is performed with a second reversible code, and
wherein the adaptively encoding process step is preceded by the step for performing a pre-process with a first reversible code.

12. The encoding method as set forth in claim 11,
wherein when the second channel signal is encoded with the time difference, the time difference encoding step is performed by supplying one dummy bit and encoding the one dummy bit and the second channel bit with the time difference.

13. The encoding method as set forth in claim 11,
wherein the dividing step is performed by dividing the signal which has been encoded with the time difference into at least high order bit data and low order bit data.

14. The encoding method as set forth in claim 11,
wherein the dividing step is performed by dividing the signal which has been encoded with the time difference into at least high order bit data, middle order bit data, and low order bit data.

15. The encoding method as set forth in claim 11,
wherein the adaptively encoding process step is performed with a reversible code.

16. The encoding method as set forth in claim 15,
wherein the adaptively encoding process step is performed with a variable length code.

17. The encoding method as set forth in claim 11,
wherein the pre-process step is performed with a universal code as the first reversible code.

18. The encoding method as set forth in claim 17,
wherein the data arranging step is performed by adding identification information which represents whether or not the output data has been encoded by the adaptively encoding process in the unit of the predetermined number of bits.

19. A decoding apparatus, comprising:
a distributing process portion for distributing data which has been arranged in a predetermined format in the unit of a predetermined number of bits;
an adaptively decoding process portion for performing a decoding process for the data distributed in the unit of the predetermined number of bits by the distributing process portion;
a time difference decoding process portion for decoding output data of the adaptively decoding process portion to a second channel signal and a difference signal of a first channel signal and the second channel signal;
and an adding process portion for adding the second channel signal and the difference signal and generating the first channel signal as an output signal;
wherein the adaptively decoding process portion is configured to perform the decoding process with a second reversible code and then perform a post-process with a first reversible code.

20. The decoding apparatus as set forth in claim 19,
wherein the distributing process portion is configured to distribute the data which has been arranged in the predetermined format to at least high order bit data and low order bit data.

21. The decoding apparatus as set forth in claim 19,
wherein the distributing process portion is configured to distribute the data which has been arranged in the predetermined format to at least high order bit data, middle order bit data, and low order bit data.

22. The decoding apparatus as set forth in claim 19,
wherein the adaptively decoding process portion is configured to perform a decoding process with a reversible code.

23. The decoding apparatus as set forth in claim 22,
wherein the adaptively decoding process portion is configured to perform an adaptively decoding process with a variable length code.

24. The decoding apparatus as set forth in claim 19,
wherein the adaptively decoding process portion is configured to judge whether or not the data has been encoded in the unit of the predetermined number of bits and decode the data when the data has been encoded.

25. The decoding apparatus as set forth in claim 24,
wherein when having judged that the data had not been encoded, the adaptively decoding process portion is configured to output the data in the unit of the predetermined number of bits distributed by the distributing processing portion.

26. The decoding apparatus as set forth in claim 24,
wherein identification information which represents whether or not the data had been encoded by the adaptively encoding process performed in the unit of the predetermined number of bits has been added to the data arranged in the predetermined format, and
wherein the adaptively decoding process portion is configured to judge whether or not data has been encoded using the identification information.

27. The decoding apparatus as set forth in claim 19,
wherein the adaptively decoding process portion is configured to perform the post-process with a universal code as the first reversible code.

28. A decoding method, comprising:
distributing data which has been arranged in a predetermined format in the unit of a predetermined number of bits;
performing an adaptively decoding process for the data distributed in the unit of the predetermined number of bits;
performing a time difference decoding process for data for which the adaptively decoding process has been performed so as to generate a second channel signal and a difference signal of a first channel signal and the second channel signal; and
adding the second channel signal and the difference signal and generating the first channel signal as an output signal;
wherein the adaptively decoding process includes decoding with a second reversible code and then performing a post-process with a first reversible code.

29. The decoding method as set forth in claim 28,
wherein the distributing step is performed by distributing the data which has been arranged in the predetermined format to at least high order bit data and low order bit data.

30. The decoding method as set forth in claim 28,
wherein the distributing step is performed by distributing the data which has been arranged in the predetermined format to at least high order bit data, middle order bit data, and low order bit data.

31. The decoding method as set forth in claim 28,
wherein the adaptively decoding process step is performed with a reversible code.

32. The decoding method as set forth in claim 31,
wherein the adaptively decoding process step is performed with a variable length code.

33. The decoding method as set forth in claim 28,
wherein the adaptively decoding process step is performed by judging whether or not the data has been encoded in the unit of the predetermined number of bits and decoding the data when the data has been encoded.

34. The decoding method as set forth in claim 33,
wherein when having judged that the data had not been encoded, the adaptively decoding process step is performed by outputting the data in the unit of the predetermined number of bits distributed.

35. The decoding method as set forth in claim 33,
wherein identification information which represents whether or not the data had been encoded by the adaptively encoding process in the unit of the predetermined number of bits has been added to the data arranged in the predetermined format, and
wherein the adaptively decoding process step is performed by judging whether or not data has been encoded using the identification information.

36. The decoding method as set forth in claim 28,
wherein the adaptively decoding process step is performed by the post-process with a universal code as the first reversible code.

37. A record medium recording method, comprising:
forming a difference signal which is the difference between a first channel signal and a second channel signal of an input PCM signal;
encoding the difference signal and the second channel signal with a time difference;
dividing the signal which has been encoded with the time difference in the unit of a predetermined number of bits;
adaptively encoding the divided data in the unit of the predetermined number of bits;
arranging the data which has been adaptively encoded to predetermined data so as to encode the data;
converting the encoded data into a predetermined data format;
performing an error correction code encoding process for the encoded data; and
performing a modulating process for the data for which the error correction code encoding process has been performed and recording the modulated data on a recording medium;
wherein the adaptively encoding process step is performed by comparing the code amount of data for which the adaptively encoding process has not been performed with the code amount of data for which the adaptively encoding process has been performed in the unit of the predetermined number of bits and outputting data whose code amount is smaller;
wherein the adaptive encoding is performed with a second reversible code, and the adaptive encoding is preceded by performing a pre-process with a first reversible code.

38. The recording medium recording method as set forth in claim 37,
wherein the converting step is performed by converting the encoded data into blocks each of which is composed of a synchronous signal of 12 bytes, a header of 4 bytes, user data of 2048 bytes, and auxiliary data of 288 bytes.

39. The recording medium recording method as set forth in claim 37,
wherein the time difference encoding step is performed by supplying one dummy bit and encoding the one dummy bit and the second channel bit with the time difference.

40. The recording medium recording method as set forth in claim 37,
wherein the dividing step is performed by dividing the signal for which the time difference encoding process has been performed into at least high order bit data and low order bit data.

41. The recording medium recording method as set forth in claim 37,
wherein the dividing step is performed by dividing the signal for which the time difference encoding process has been performed into at least high order bit data, middle order bit data, and low order bit data.

42. The recording medium recording method as set forth in claim 37,
wherein the adaptively encoding process step is performed with a reversible code.

43. The recording medium recording method as set forth in claim 42,
wherein the adaptively encoding process step is performed with a variable length code.

44. The recording medium recording method as set forth in claim 37,
wherein the pre-process step is performed with a universal code as the first reversible code.

45. The recording medium recording method as set forth in claim 44,
wherein the arranging step is performed by adding identification information which represents whether or not the data has been encoded by the adaptively encoding process in the unit of the predetermined number of bits.

46. A recording medium reproducing method, comprising:
demodulating data which has been read from a recording medium;
performing an error correcting process for the demodulated data;
converting the data for which the error correcting process has been performed into a predetermined data format;
distributing the converted data in the unit of a predetermined number of bits;
adaptively decoding data in the unit of the predetermined number of bits which has been distributed;
performing a time difference decoding process for the data which has been adaptively decoded so as to generate a second channel signal and a difference signal which is the difference between a first channel signal and the second channel signal;
adding the second channel signal and the difference signal; and
generating the first channel signal as an output signal;
wherein the adaptive decoding includes,
performing the decoding process with a second reversible code, and
performing a post-process with a first reversible code.

47. The recording medium reproducing method as set forth in claim 46,
wherein the error correcting process step comprises:
performing an error correcting process and an interleaving process for data for which the error correcting process has been performed in the unit of a symbol which is high order eight bits or low order eight bits of one sample; and
converting the data into data of blocks each of which is composed of 98 frames.

48. The recording medium reproducing method as set forth in claim 46,
wherein the distributing step is performed by distributing the data arranged in the predetermined format into at least high order bit data and low order bit data.

49. The recording medium reproducing method as set forth in claim 46,
wherein the distributing step is performed by distributing the data arranged in the predetermined format into at least high order bit data, middle order bit data, and low order bit data.

50. The recording medium reproducing method as set forth in claim 46,
wherein the adaptively decoding process step is performed with a reversible code.

51. The recording medium reproducing method as set forth in claim 50,
wherein the adaptively decoding process step is performed with a variable length code.

52. The recording medium reproducing method as set forth in claim 46,
wherein the adaptively decoding process step is performed by judging whether or not the data has been encoded in the unit of the predetermined number of bits and decoding the data when the data has been encoded.

53. The recording medium reproducing method as set forth in claim 52, wherein when having judged that the encoding process had not been performed, the adaptively decoding process step is performed by outputting the data in the unit of the predetermined number of bits distributed.

54. The recording medium reproducing method as set forth in claim 52, wherein identification information which represents whether or not the data had been encoded by the adaptively encoding process in the unit of the predetermined number of bits has been added to the data which had been converted into the predetermined format, and wherein the adaptively decoding process step is performed by judging whether or not data has been performed encoded using the identification information.

55. The recording medium reproducing method as set forth in claim 46, wherein the first reversible code is a universal code.

* * * * *